United States Patent [19]
Johnson et al.

[11] Patent Number: 5,148,433
[45] Date of Patent: Sep. 15, 1992

[54] TRANSFER NETWORK INTERFACE

[75] Inventors: David K. Johnson, Waukesha; Mark S. Weber, Germantown, both of Wis.

[73] Assignee: Square D Company, Palatine, Ill.

[21] Appl. No.: 322,590

[22] Filed: Mar. 13, 1989

[51] Int. Cl.$^5$ .............................................. G06F 11/20
[52] U.S. Cl. ................................ 371/11.3; 340/825.52
[58] Field of Search ................ 371/11.3, 9.1; 364/268; 340/825.52

[56] References Cited

U.S. PATENT DOCUMENTS

| 4,210,901 | 7/1980 | Whyte et al. | 340/310 R |
| 4,360,870 | 11/1982 | McVey | 364/200 |
| 4,817,091 | 3/1989 | Katzman et al. | 364/200 |

OTHER PUBLICATIONS

Bonney, R., "For μP-system data entry, thumbwheel switches excel", *EDN*, Feb. 5, 1980, pp. 161-165.

*Primary Examiner*—Stephen M. Baker
*Attorney, Agent, or Firm*—Michael J. Femal; Thomas K. Stine; Richard J. Graefe

[57] ABSTRACT

A transfer network interface module provides a communication link between a data communications network bus connecting a plurality of processor based devices and a redundant processing system. The redundant processor system has first and second processor based devices communicatively coupled to at least one other remote based device by means of the data communication network. The first processor based device operates on an active status and the second processor based device operates on a backup status until a switch occurs. The switch causes the second processor based device to begin operation on active status. The transfer network interface device is communicatively disposed between the first and second processor based devices and the data communications network and permits continuous communication between either of the first and second processor based devices and the remote processor based device regardless of which of the first and second processor based devices is on active status. Each transfer network interface module has a thumbmwheel switch for setting a unique address and a mutually common address on the data communications network.

8 Claims, 1 Drawing Sheet

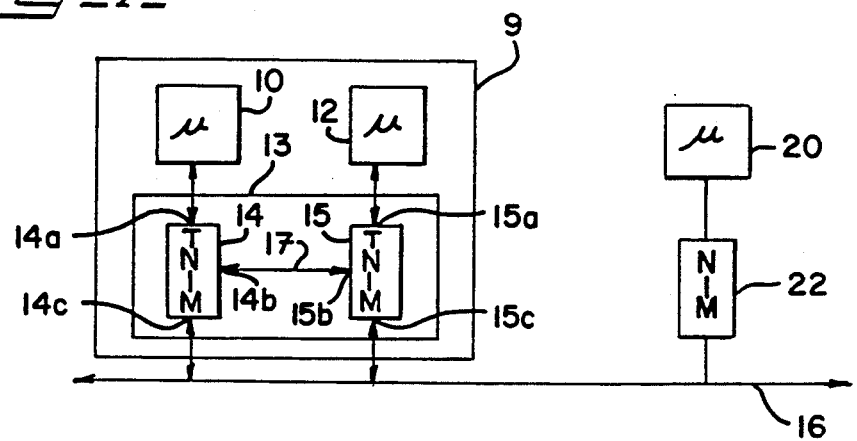
FIG_1_
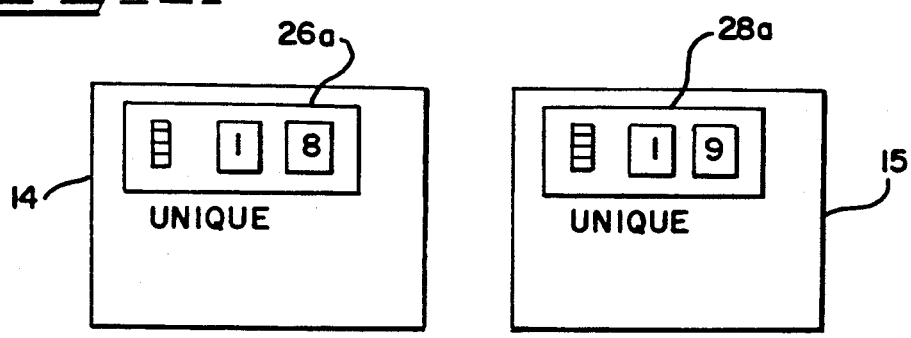
FIG_2_
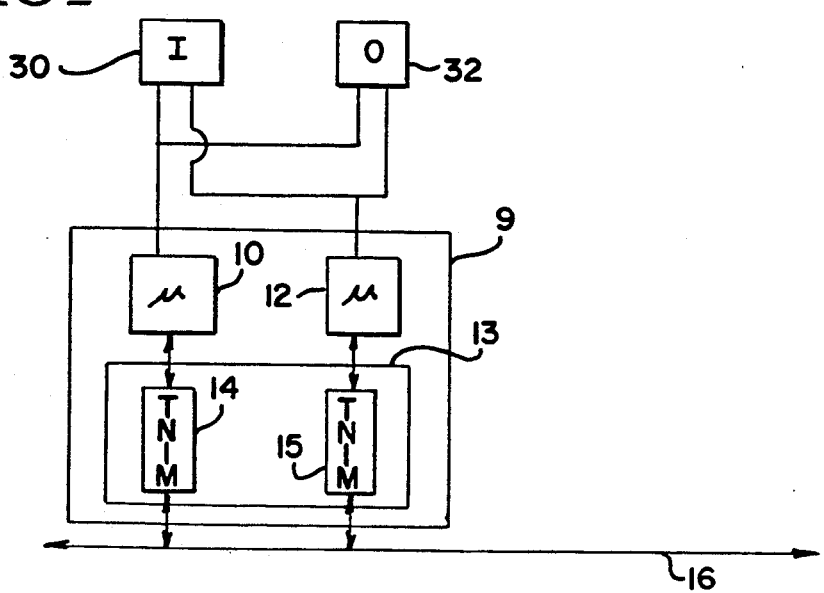
FIG_3_

TRANSFER NETWORK INTERFACE

TECHNICAL FIELD

The invention relates to a redundant processing system having an active processor and a backup processor, both coupled to a data communications network and, more particularly, to a redundant processing system wherein both the active and the backup processor can continuously communicate with other devices also coupled to the data communications

BACKGROUND PRIOR ART

In modern industrial control, processor based devices such as programmable logic controllers (PLC's) perform a majority of control operations on a production line. The processor based device can be coupled to a data communication network by a network interface module so that the processor based device can communicate with other processor based devices also coupled to the data communication network. However, as with any machine, such processor based devices and associated hardware and software are subject to failure. In addition it is often necessary to shut down the processor based device to perform preventative maintenance. Often this failure or planned shut down will result in a complete shutdown of the production line.

To minimize this problem, redundant processor systems have been developed wherein a single processor based device is replaced by a pair of processor based devices. One of the processor based devices operates as a primary processor based device and the other operates as a backup processor based device. In the event of a failure of the primary processor based device, the backup processor based device takes over control.

In order to insure that messages are sent to the primary processor based device, both the primary and backup processor based devices were assigned the same data addresses for receiving messages. However only the primary processor based device would monitor the data communications network. The back up processor based device was dormant, and therefore effectively prevented from communicating with other processor based devices on the data communications network.

Accordingly because the back up processor based device was shut off from the data communications network, other devices could not communicate with it, such as to perform such functions as to load new programs, to perform diagnostics or to check status.

The present invention is provided to solve these and other problems.

SUMMARY OF THE INVENTION

It is an object of the present invention to provide a transfer network interface for a redundant processor system.

The redundant processor system comprises first and second processor based devices communicatively coupled to at least one other remote processor based device by means of a data communication network. The data communication network conveys blocks of data to desired addresses.

The first processor based device operates on active status and the second processor based device operates on backup status until a transfer occurs. The transfer causes the second processor based device to operate on active status.

The transfer network interface device permits continuous communication between either of the first and second processor based devices and the remote processor based device.

The transfer network interface device comprises first and second transfer network interface modules, each communicatively coupled between a respective one of the first and second processor based devices and the data communication network for transferring data between the respective first and second processor based devices and the data communication network.

Each of the first and second transfer network interface modules has a unique address and a common address on the data communication network.

The first transfer network interface module includes means continuously responsive to data blocks addressed to its unique address and responsive to data blocks addressed to the common address when the first processor based device is active. Likewise, the second transfer network interface module includes means continuously responsive to data blocks addressed to its unique address and responsive to data blocks addressed to the common address when the second processor based device is active.

Other features and advantages of the invention will be apparent from the following specification taken in conjunction with the following drawings.

BRIEF DESCRIPTION OF DRAWINGS

FIG. 1 is a block diagram of a redundant processor system coupled to a data communication network;

FIG. 2 illustrates thumbwheel switches for setting addresses for processor based devices; and FIG. 3 is a block diagram of a redundant processor system coupled to an input and an output device.

DETAILED DESCRIPTION

While our invention is susceptible of embodiments in many different forms, there is shown in the drawings, and will herein be described in detail, a preferred embodiment of the invention with the understanding that the present disclosure is to be considered as an exemplification of the principles of our invention and is not intended to limit the broad aspects of our invention to the embodiment illustrated.

A block diagram of a redundant processor system 9 incorporating the invention is illustrated in FIG. 1.

The redundant processor system 9 includes first and second processor based devices, such as programmable logic controllers (PLC's), 10 and 12. As used hereinafter, the first and second processor based devices 10, 12 will be referred to as the first and second PLC's 10, 12, respectively, though it is to be understood that the invention is equally applicable to any processor based device.

The redundant processor system 9 further includes a transfer network interface device 13. The transfer network interface device 13 comprises first and second transfer network interface modules (or TNIM's) 14, 15. The first and second TNIM's 14, 15 include first and second serial ports, 14a, 14b and 15a, 15b, and a coaxial port 14c, 15c, respectively.

The first TNIM 14 is coupled to the first PLC 10 via the first serial port 14a of the first TNIM 14. The first TNIM 14 is also coupled to a data communication network 16 via the coaxial port 14c of the first TNIM 14. The first TNIM 14 operates to communicatively couple the first PLC 10 with the data communication network 16.

The second TNIM 15 is similarly coupled between the second PLC 12 and the data communication network 16. Specifically the second TNIM 15 is coupled to the second PLC 12 via the first serial port 15a of the second TNIM 15. The second TNIM 15 is also coupled to the data communication network 16 via the coaxial port 15c of the second TNIM 15. The second TNIM 15 operates to communicatively couple the second PLC 12 with the data communication network 16.

The first and second TNIM's 14, 15 are mutually communicatively coupled via a TNIM link 17 between the serial ports 14b, 15b of the first and second TNIM's 14, 15.

The data communication network 16 conveys messages between various devices coupled thereto, and may utilize any of various communication protocols, as is well known in the art. The messages are conveyed along the data communication network 16 in the form of blocks of data, and each of the blocks of data includes an address identifying an intended recipient of each of the messages.

Also coupled to the data communication network 16 is a remote processor based device 20, which is coupled to the data communication network 16 by a network interface module, or NIM, 22.

The remote processor based device 20 may be a network manager, a programming device, another PLC or computer forming an additional part of a distributed control system, or any other processor based device.

As discussed in greater detail below, the first and second TNIM's 14, 15 and the NIM 22 operate as communication processors/buffers for the processor based devices to which they are coupled, transferring data between the data communication network 16 and their respective processor based devices.

The first and second PLC's 10, 12 cooperate as redundant PLC's. Specifically at any given time, one of the first and second PLC's 10, 12 operates on active status, and the other of the first and second PLC's 10, 12 operates on backup status.

Although not a part of our invention, upon start-up, both of the first and second PLC's 10, 12, as well as their respective TNIM's 14, 15, are in a backup status. An algorithm contained in the operating software of the first and second PLC's 10, 12 causes one of the first and second PLC's 10, 12 to assume active status.

The first TNIM 14 operates as a communication processor for the first PLC 10. Specifically the first TNIM 14 receives messages addressed to the first TNIM 14 from the data communication network 16 and temporarily stores the received messages until the first PLC 10 can itself accept the messages from the first TNIM 14. In addition, the first TNIM 14 temporarily stores messages generated by the first PLC 10 until an opening on the data communication network 16 permits the first TNIM 14 to transfer the temporarily stored message to the data communication network 16. The second TNIM 15 operates similarly with respect the second PLC 12.

The NIM 22 receives messages addressed to it from the data communication network 16 and transfers the received messages to eh remote processor base device 20. The NIM 22 also stores messages generated by the remote processor based device 20 until an opening to the data communication network 16 permits the NIM 22 to transfer the generated messages onto the data communication network 16.

According to prior redundant processor systems, both the active and the backup processor devices utilized the same, primary address. To insure that messages were only received by the active processor device, the backup processor, and its associated interface, were made inactive. Thus messages to be sent to the active processor device were simply addressed to the primary address.

For certain operations, this arrangement worked satisfactorily. However, it has serious limitations. For example such prior systems were specifically unable to communicate either with the backup processor device or its associated backup interface, such as to perform on-line diagnostics. In addition, one could not down load a new program to either the primary or the back up processor device during system operation because of a potential that a transfer would occur during the down load, causing the first part to the program to be received by the original active processor device, and the balance of the program to be received by the newly active processor device.

In accordance with our invention, the first and second TNIM's 14, 15 ar each assigned a unique address as well s a mutually common address. Accordingly, if one desires to send data specifically to either the first or the second TNIM 14, 15, one utilizes the specific, unique address for the desired note of the fist and second TNIM's 14, 15. If one desires to send a message to the currently active PLC, regardless of whether it happens to be the first or the second PLC 10, 12, one utilizes the common address.

According to our invention, other devices coupled to the data communication network 16, such as the NIM 22, can continue to communicate with either of the first and second PLC's 10, 12 and either of the first and second TNIM's 14, 15, regardless of which pair are currently active. This permits the remote processor base device 20 to determine, for example, whether the backup one of the TNIM's 14, 15 is coupled to the data communication network 16, whether the backup one of the TNIM's 14, 15 is coupled to the current backup one of one of the PLC's 10, 12 and whether the current backup one of the TNIM's 14, 15 is coupled to the current primary one of the TNIM's 14, 15.

Further, programs can be down loaded on-line while the system is operating because the program can be sent specifically to the unique addresses of the first and second TNIM's 14, 15, which are unaffected by a control transfer.

Because the backup one of the TNIM's 14, 15 does not go dormant, it constantly monitors the data communication network 16 for messages. As discussed below, the backup one of the TNIM's 14, 15 is simply not responsive to messages directed to the common address, but accepts messages sent to the common address when it becomes the active one of the TNIM's 14, 15.

The active one of the PLC's 10, 12 and its respective TNIM 14 or 15 continues on active status until a transfer is commanded, as discussed below.

In the event a failure occurs with respect to the active one of the PLC's 10, 12, control automatically transfers to the backup one of the PLC's 10, 12. This control transfer causes the backup one of the PLC's 10, 12 to assume active status and, thereby, become the active one of the PLC's 10, 12. Specifically, a control transfer can be commanded via either of two transfer routes.

Each of the TNIM's 14, 15 has a control status register, not illustrated, the value of which determines whether the particular TNIM 14, 15 is on active or backup status. In operation, the active one of the TNIM's 14, 15 continues on active status until a transfer is commanded, which changes the value in the control status register, causing the active one of the TNIM's 14, 15 to switch to backup status. Similarly the backup one of the TNIM's 14, 15 continues on backup status until a transfer is commanded, which changes the value in its control status register, causing the backup one of the TNIM's 14, 15 to switch to active status.

According to the first transfer route, when the active one of the PLC's 10, 12 fails, a flag is set in a register of the backup one of the PLC's 10, 12. Operating software of the backup one of the PLC's 10, 12 responds to this set flag, commanding the backup one of the PLC's 10, 12 to assume active status. The now active one of the PLC's 10, 12 then changes the value in the control status register of the respective one of the first and second TNIM's 14, 15, causing it to assume active status. The now backup one of the PLC's 10, 12 also changes the value in the status control register of its associated one of the TNIM's 14, 15, causing it to assume backup status.

The second transfer route is utilized if a failure of the active one of the PLC's 10, 12 is of a type or severity which prevents it from issuing a command to the backup one of the PLC's 10, 12 to assume active status.

According to the second transfer route, the backup one of the PLC's 10, 12 periodically polls the active one of the PLC's 10, 12 to determine whether a failure of the active one of the PLC's 10, 12 has occurred. In the event the backup one of the PLC's 10, 12 detects a failure of the active one of the PLC's 10, 12, the backup one of the PLC's 10, 12 assumes active status on its own initiative. Further, the now active one of the PLC's 10, 12 commands its respective one of the first and second TNIM's 14, 15 to assume active status. The now active one of the PLC's 10, 12 also commands the respective TNIM 14, 15 of the now backup one of the PLC's 10, 12, via the TNIM link 17, to assume backup status. Thus a control transfer will occur regardless of the severity or type of failure of the active one of the PLC's 10, 12, or of the active one of the TNIM's 14, 15.

Diagnostic registers, not shown, are provided in each of the TNIM's 14, 15 for monitoring the status of control transfers.

Referring to FIG. 2, a first thumbwheel switch 26a is mounted on the first TNIM 14. The first thumbwheel switch 26a sets the unique address for the first TNIM 14. Similarly a second thumbwheel switch 28a is mounted on the second TNIM 15 and sets the unique address of the second TNIM 15.

In our preferred embodiment, the first TNIM 14 is assigned an even numbered unique address and the second TNIM 15 is assigned a subsequent, odd numbered unique address. The common address is the even number subsequent to the odd numbered address of the second TNIM 15. According to this numbering scheme, the first and second TNIM's 14, 15 automatically determine their common address, and it does not need to be manually set. Of course, an additional thumbwheel switch, or the like, could be provided on each of the TNIM's 14, 15, and the common address could be manually set without departing from the scope of our invention.

Referring to FIG. 3, the redundant processor system 9 is illustrated coupled to an input device 30 and an output device 32. It is understood that typically a PLC is coupled to many input devices and many output devices. FIG. 3 and the related discussion show only one input device and one output device for purposes of clarity, and it is to be understood that our invention should in any way be so limited.

Assuming for purposes of explanation of FIG. 3 that the first PLC 10 is the active one of the PLC's 10, 12 and the second PLC 12 is the backup one of the PLC's 10, 12, the first PLC 10 will transmit commands to the output device 32 and will receive, and operate in response to, data received from the input device 30.

According to the invention, because the second, backup PLC 12 continues to monitor operations rather than become dormant, the backup PLC 12 remains continuously updated with respect to the status of the input device 30 and the output device 32. Thus, in the event of a control transfer, and the second PLC 12 takes control, the second, now active, PLC 12 will know the current values of the input device 30 and the output device 32.

It will be understood that our invention may be embodied in other specific forms without departing from the spirit or central characteristics thereof. The present examples and embodiments, therefore, are to be considered in all respects as illustrative and not restrictive, and our invention is not to be limited to the details given herein.

We claim:

1. For a redundant processor system having first and second processor based devices, the redundant processor system communicatively coupled to at least one other remote processor based device by means of a data communication network, said data communication network conveying blocks of data to designated addresses, wherein said first processor based device operates on active status and said second processor based device operates on backup status until a switch occurs, said switch using said second processor based device to operate on active satus, a transfer network interface device for permitting continuous communication between either of said first and second processor based devices and said remote processor based device, the transfer network interface device comprising:

(a) first and second transfer network interface modules, each communicatively coupled between a respective one of said first and second processor based devices and the data communication network for transferring data between said respective fist and second processor based device and said data communication network, wherein each of said first and second transfer network interface modules has a thumbwheel switch for setting both of a unique address and a mutually common address on the data communication network;

(b) said first transfer network interface module including means continuously responsive to data blocks addressed to its unique address, and responsive to data blocks addressed to its common address when said first processor based device is active; and (c) said second transfer network interface module including means continuously responsive to data blocks addressed to its unique address, and responsive to data blocks addressed to its common address when said second processor based device is active.

2. For a redundant processor system having fist and second processor based devices, the redundant processor system communicatively coupled to a t least one other remote processor based device by means of a data communication network, said data communication network conveying blocks of data to desired addresses, wherein said first processor based device operates on active status and the second processor based device operates on backup status until a switch occurs, said switch causing said second processor based device to operate on active status, a transfer network interface device for permitting continuous communication between either of said first and second processor based devices and said remote processor based device, the transfer network interface device comprising:

(a) first and second transfer network interface modules, each communicatively coupled between a respective one of said first and second processor based devices and the data communication network, said first and second transfer network interface modules for transferring data between said respective first and second processor based device and said data communication network, wherein each of said first and second transfer network interface modules has a thumbwheel switch for setting both of a unique address and a mutually common address to the data communication network;

(b) means for detecting which of said processor based devices is operating on active status;

(c) means responsive to said detecting means for permitting the particular transfer network interface module associated with said active processor based device to transfer said blocks of data addressed to said common address from said data communications network to said active processor based device, wherein a block of data directed to said active processor is addressed to said common address nd a block of data directed to a particular one of said first and second transfer network interface modules is directed to said unique address of said particular firs or second transfer network interface e module.

3. The transfer network interface module of claim 2 wherein said responsive means comprises means for causing said transfer network interface module associated with said active processor based device to assume said common address.

4. A redundant transfer processor system operable on a data communication network comprising:

(a) first and second processor based devices adapted for communicating with a remote processor based device coupled to said data communication network;

(b) means or operating one of said first and second processor based device on active status and the other of said first and second processor based device on backup status;

(c) means for detecting a failure affecting operation of said active one of said first and second processor based devices;

(d) means responsive to said failure detection for causing said other of said first and second processor based devices operating on hakup status to assume said active status;

(e) first and second transfer network interface modules, each communicatively coupled between a respective one of said fist and second processor based devices and said data communication network, said first and second transfer network interface modules or transferring data between said respective first and second processor based devices and said data communication network, wherein each of said first and second transfer network interface modules has a thumbwheel switch for setting both of a unique address and a mutually common address on the data communication network;

(f) means or detecting which of said processor based devices is operating on active status;

(g) means responsive to said detecting means for permitting the particular transfer network interface module associated with said active processor based device to transfer said blocks of data addressed to said common address from said data communications network to said active processor based device, wherein a block of data directed to said active processor is addressed to said common address and a bock of data directed to a particular one of said first and second transfer network interface modules is directed to said unique address of said particular first or second transfer network interface module, said redundant processor system permitting blocks of data conveyed on said data communication network to selectively be delivered to said active one of said first and second processor based devices, or specifically to either of said fist and second processor based devices.

5. The redundant transfer processor system of claim 4 wherein said first and second processor based devices comprise programmable logic controllers.

6. The redundant transfer processor system claim 4 wherein said active one of said first and second processor based devices includes means for generating output commands for operating an output device, and further including:

an output device coupled to said first and second processor based devices, said output device operable in response to said output commands generated by said active one of said first and second processor based devices; and means associated with said backup one of said first and second processor based devices for monitoring operation of said output device, 7. The redundant transfer processor system of claim 4 including:

an input device coupled to said first and second processor based devices, said input device generating a signal representing a condition, wherein both said first and said second processor based devices continuously monitor said condition.

8. For a redundant processor system having first and second processor based devices coupled to a data communication network, said data communication network transmitting blocks of data to desired addresses, said redundant processor system operating gin a fist start of operation wherein the first processor based device operates in an active status and the second processor based device operated in a backup status, said first state of operation wherein said first processor based device operates in said backup status and said second processor based device operates in said active status, a transfer network interface for coupling said first and second processor based devices to said data communications network, said transfer network interface comprising:

(a) a first transfer network interface module coupled between said first processor based device and said data communication network, said first transfer network interface module alternatively operable in an active mode when said first processor based device is active or a backup mode when said first processor based device is in said backup mode, said fist transfer network interface module operative to transfer blocks of data between said first processor based device and said data communication network;

(b) a second transfer network interface module coupled between said second processor based device and said data communication network, said second transfer network interface module alternatively operable in an active mode when said second processor based device is active or a backup mode when said second processor based device is in said backup mode, said second transfer network interface module operative to transfer blocks of data between said second processor based device and said data communication network; and (c) wherein each of said fist and second transfer network interface modules has a thumbwheel switch for setting both of a unique address as well as a mutually common address on said data communication network, said first and second transfer network interface module including means for continuously receiving blocks of data on said data communications network having their respective unique addresses, and for receiving blocks of data on said data communications network having said common address only when said particular first and second transfer network interface module si active.

* * * * *